United States Patent [19]

Tsumita et al.

[11] Patent Number: 4,842,502
[45] Date of Patent: Jun. 27, 1989

[54] COTTON CANDY MACHINE

[75] Inventors: Mitsuyo Tsumita; Yuji Yamane, both of Tokyo, Japan

[73] Assignee: Tomy Kogyo Co., Inc., Tokyo, Japan

[21] Appl. No.: 144,064

[22] Filed: Jan. 15, 1988

[30] Foreign Application Priority Data

May 20, 1986 [JP] Japan ................................ 61-76105

[51] Int. Cl.$^4$ ............................................ B29C 67/02
[52] U.S. Cl. ................................................. 425/9
[58] Field of Search ........................................ 425/9

[56] References Cited

U.S. PATENT DOCUMENTS 1,541,378  6/1925  Parcell ..................................... 425/9
1,806,111  5/1931  Moad ....................................... 425/9

FOREIGN PATENT DOCUMENTS 0028162 of 1905 United Kingdom ..................... 425/9

OTHER PUBLICATIONS

Tomy Catalogue, printed and published in Japan in May, 1986.
Toys Magazine, printed and published in Japan in Sep., 1986.

Primary Examiner—Charles Hart
Attorney, Agent, or Firm—Staas & Halsey

[57] ABSTRACT

A cotton candy machine is provided with a rotating pan and a heating element disposed adjacent a bottom of the rotating pan and being rotatable with the rotating pan. A sliding electrical connection is provided between the heating element and a power source in order to supply electric current which is necessary to heat the heating element.

11 Claims, 3 Drawing Sheets

COTTON CANDY MACHINE

BACKGROUND OF THE INVENTION

1. Field of the Invention

This invention relates generally to toys and more specifically, to a cotton candy machine wherein sugar or the like such as granulated sugar is heated and melted in a rotary pan and is discharged through a discharging outlet provided at the circumference of the pan so as to produce confectionery in a cotton-like form.

2. Description of the Related Art

Known cotton candy machines, such as the one shown in Japanese Utility Model Publication No. 39-4098, include a rotary pan in which sugar or the like is received and heated until melted by a heating device arranged just under the rotary pan. The heated sugar is discharged through small holes formed in a circumferential wall of the rotary pan and is then cooled in order to form cotton candy in cotton-like form.

In the conventional cotton candy machine described above, a problem has resulted from the fact that, since the heating device is fixedly disposed under the rotary pan and is separate from the rotary pan, a clearance is formed between the rotary pan and the heating device, and relative rotation of the rotary pan and the heating device is permitted. Accordingly, the problem is that the heating efficiency of the heating device is reduced by heat transfer to the ambient air which is exposed to the clearance or gap between the rotary pan and the non-rotating heating device.

SUMMARY OF THE INVENTION

An object of the invention is to provide a cotton candy machine with increased heating efficiency.

Another object of the invention is to eliminate or reduce the clearance or gap between a rotary pan and a heating element, in which heat is normally lost to ambient air.

These and other objects of the invention are achieved by providing a cotton candy machine wherein sugar or the like is received within a rotary pan which is heated in order to melt the sugar by a heating device and the melted sugar is discharged through a discharging outlet provided at the circumference of the rotary pan. The discharged sugar is cooled to form cotton candy in a cottonlike form, and wherein the heating device is arranged adjacent to a lower side of a pan bottom of the rotary pan and is rotatable integrally with the rotary pan. The aforementioned arrangement prevents air from circulating between the heating device and the rotary pay bottom by having the heating device and the rotary pan rotate in unison in close proximity to each other. As a result, heat is prevented from radiating outwardly so that thermal efficiency or transfer of heat from the heating device to the rotary pan is improved.

DETAILED DESCRIPTION OF THE PREFERRED EMBODIMENTS

Figure 3:
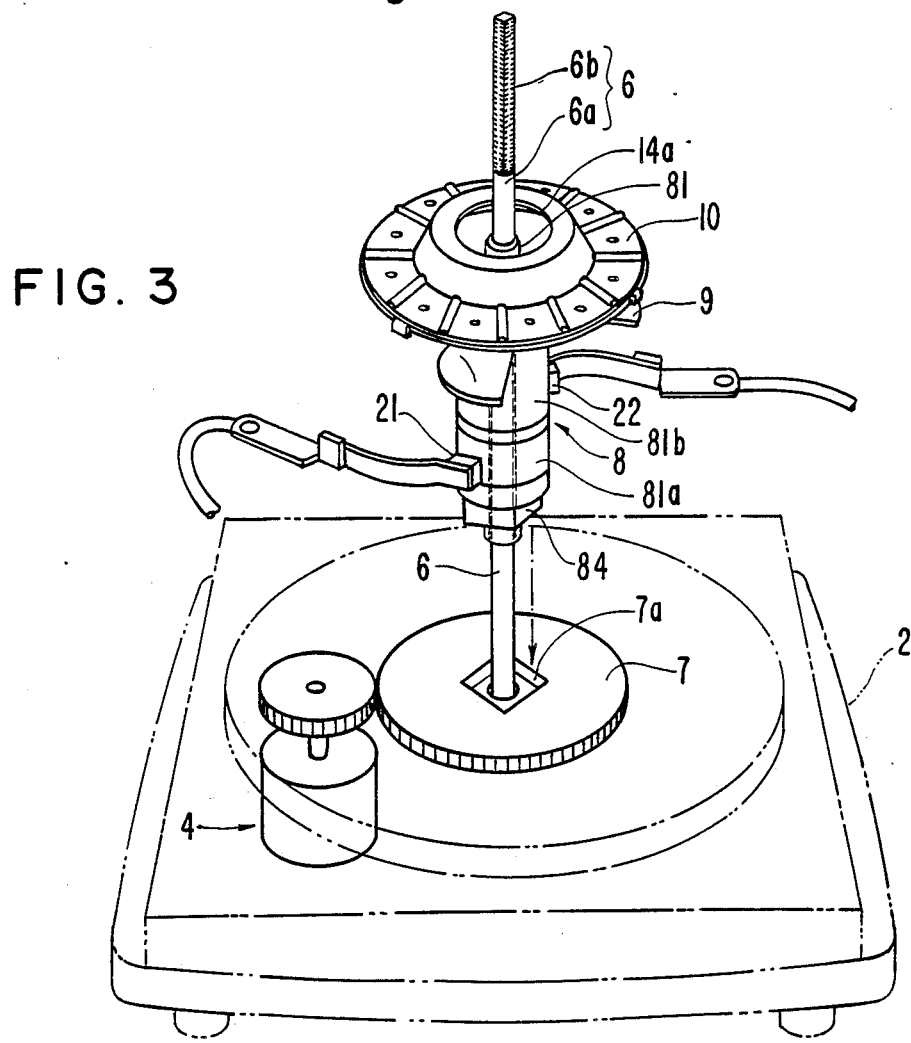
FIG. 3 is a perspective view of the embodiment of FIG. 1 partially assembled.
Figure 4:
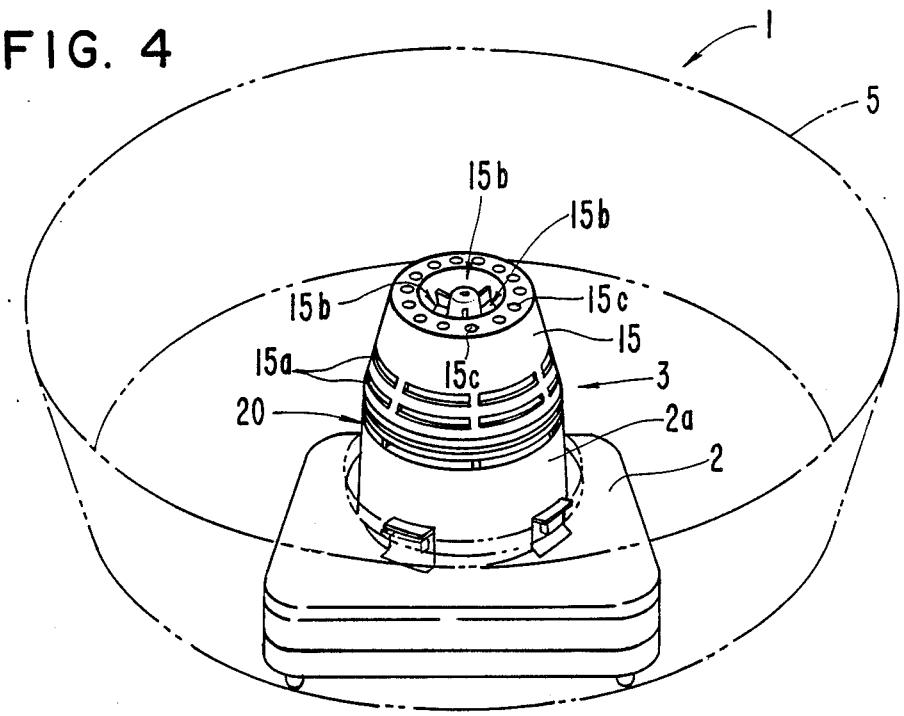
FIG. 4 is a perspective view of the fully assembled machine.

Referring to FIGS. 3 and 4, a cotton candy machine 1 has a base 2 which houses a driving mechanism or motor 4. A body 3 for making cotton candy extends upwardly from the base 2 while a reservoir or dish 5 surrounds the body 3 and is supported on the base 2. The dish 5 is shown in broken lines for illustration purposes.

Figure 1:
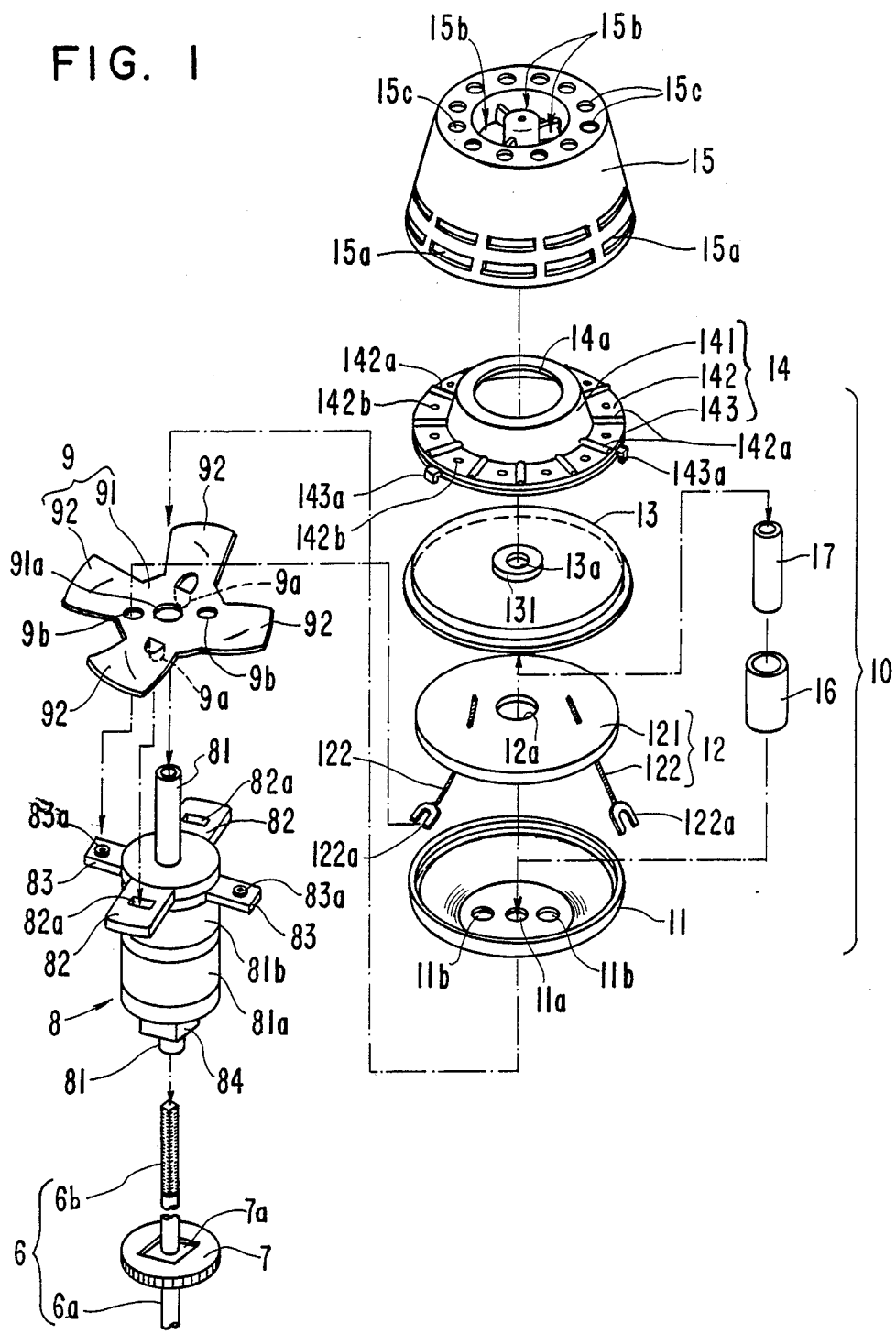
FIG. 1 is an exploded perspective view of a cotton candy machine body of the present invention.

As shown in FIG. 1, the body 3 includes a rotary member 8 which has a hollow tubular shaft 81 passing centrally therethrough through which is fitted a fixed vertical shaft 6 which extends upwardly from the base 2. The tubular shaft 81 and the rotary member 8 rotate integrally with a gear 7 which meshes with a driving gear associated with the motor 4. A fan 9 and a rotary pan 10 are fixed to the upper end of the rotary member 8 with an upper portion of the tubular shaft 81 passing through central apertures 11a, 12a, 13a and 14a associated with the fan 9 and rotary pan 10. As a result, the fan 9 and rotary pan 10 rotate integrally with the rotary member 8. A cover 15 is fixed to a threaded portion 6b provided at an upper end of the fixed vertical shaft 6 so as to project over the rotary pan 10 and cover an upper half thereof. By fixing the cover 15 to the non-rotating shaft 6, the cover 15 is made non-rotating.

The fixed vertical shaft 6 is provided with a smooth cylindrical outer surface 6a over its lower portion. The upper portion 6b is threaded as previously mentioned. The gear 7, the rotary member 8, the fan 9, and the rotary pan 10 are mounted on the smooth surface portion 6a of the shaft 6 to rotate in unison. The rotary member 8 has a cylindrical portion mounted at its upper end and has diametrically opposite strips 82 fixed thereto extending radially outwardly therefrom. Diametrically opposite electrode mounting strips 83 are arranged at right angles to strips 82 to form a cross shape. A square member or nut 84 is mounted to the rotary member 8 at its opposite end which is fitted into a similarly shaped recess 7a provided in gear 7.

The cylindrical portion of the tubular shaft 81 is rolled with lower and upper conductive elements or rings 81a, 81b which are insulated from each other but electrically connected or in contact with electrode mounting strips 83. The mounting strips 83 are provided with threaded electrodes 83a which are in turn electrically connected to the conductive elements 81a, 81b so as to provide a positive connection and a negative connection for a d.c. power source. Connection of the threaded electrodes 83a to the conductive elements 81a, 81b can be by any conventional electrical connection, so long as the two conductive elements remain electrically insulated from each other. For instance, all components of the rotary member 8 can be made of non-conductive materials, except for the conductive elements 81a and 81b, including the strips 82 and 83. The threaded electrodes 83a would have to be conductive, with one of the two threaded electrodes being connected electrically to one of the two conductive elements. This could be done with internal wires not shown in the drawings.

Referring to FIG. 1, the fan 9 includes a base 91 which is attachable to an end face of the rotary member 8 with a central aperture 91a being fitted over the tubular shaft 81. Equidistantly spaced blades 92 generate air flow upon rotation. Apertures 9b are alternately formed equidistantly with downwardly bent strips 9a near the peripheral edge of base 91. Relative rotation between the fan 9 and the rotary member 8 is prevented by fitting the bent strip 9a into the mounting holes 82a provided on strips 82.

Figure 2:
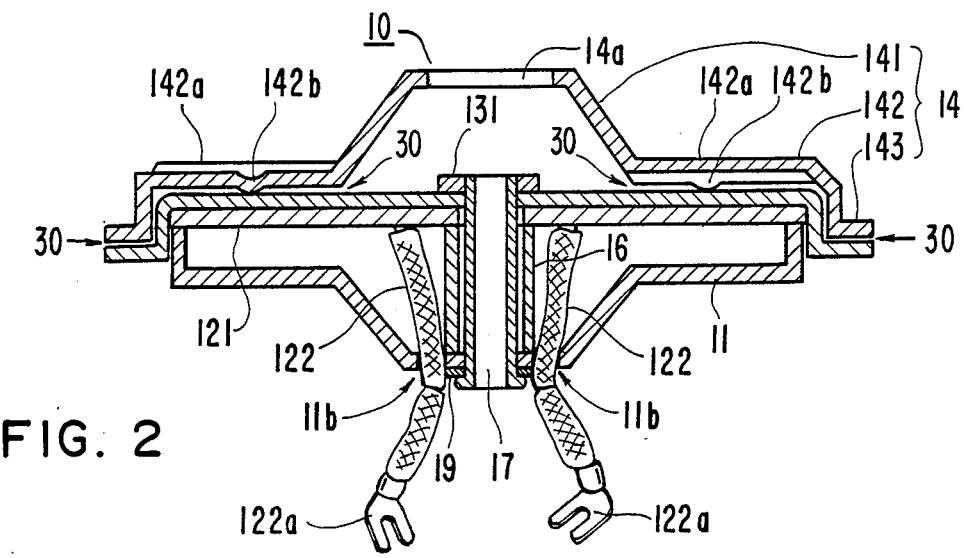
FIG. 2 is a cross-sectional view of the rotary pan of FIG. 1.

Again referring to FIG. 1, the rotary pan 10 includes a lower dish 11, an electric heating element 12 which is placed on an open upper end of the lower dish 11, and a pan bottom plate 13 which is placed over the electric heating element 12. A tubular spacer 16 extends upwardly from the lower dish 11 and acts to position the electric heating element 12 adjacent to the lower surface of the pan bottom plate 13. As illustrated in FIG. 2, a tubular rivet 17 passes through the tubular spacer 16 to connect a pan lid 14 to the lower dish 11. The pan lid 14 is mounted to the pan bottom plate 13 in such a way as to cover the upper portion of the pan bottom plate.

The lower dish 11 is formed in a dish-like shape having a recessed portion in its center. An aperture 11a is provided centrally for receiving the tubular rivet 17 therethrough. Apertures 11b are formed on opposite sides of the aperture 11a to provide outlets for electrical leads.

The electric heating element 12 is composed of an electric heating plate 121 which generates heat resistively in response to a flow of electric current. The plate is provided with a positive and negative leads 122 for conducting electricity to the heating element 121. The leads 122 extend through the apertures 11b downwardly and pass through apertures 9b of the fan 9. Ends of the electrical leads are connected to the threaded electrodes 83a of the electrode mounting strips 83 by means of terminals 122a, such as by being screwed onto the threaded electrodes 83a.

The pan bottom plate 13 is of a shallow hatlike shape and is mounted with a lower surface of its upper plate portion being in close proximity to the upper surface of the electric heating plate 121 in such a way as to cover the upper surface of the electric heating element 121 and the upper end of the lower dish 11.

The pan lid 14 is also of a hat-like shape and includes a central raised portion 141 projecting upwardly from an upper plate 142 concentric with the central raised portion 141. A brim or flange portion 143 extends peripherally around the upper plate 142. An opening 14a is provided in the center of the raised portion 141 and provides an inlet or opening for adding sugar or the like. Ribs 142a are formed on the upper plate 142 by bending corresponding portions of the upper plate 142 upwardly. Projections 142b are formed between the ribs 142a of the upper plate 142 and extend downwardly in the direction opposite that of the ribs. Discharge outlets 30 are formed between the pan lid 14 and the pan bottom plate 13 by virtue of the projections 142b in a manner best illustrated in FIG. 2. The clearance between pan lid 14 and plate 13, which constitutes the discharge outlets 30, allow peripheral discharge of melted sugar or the like.

As shown in FIG. 1, the cover 15 is of a truncated cone-shape similar to an inverted flower pot and is open at its lower portion. Air circulating holes 15a are formed radially at the circumference of the lower portion of the cover 15. Inlets 15b for sugar or the like and air circulating holes 15c are formed at the closed upper end of the cover 15. The cover 15 is non-rotatably mounted on the threaded portion 6b of the fixed vertical shaft 6 in such a way as to cover an upper half of the rotary pan 10.

When all of the above components are assembled onto the base 2 as shown in FIG. 4, the position of clearance 20 formed between the lower end of the cover 15 and a cylindrical tubular member 2a formed at the center of the base 2 coincides with the position of the openings 30 formed between the peripheral edges of the pan lid 14 and the pan bottom plate 13 of the rotary pan 10.

As shown in FIG. 3, brushes 21, 22 connected to an electric power source (not shown) are in slidable contact with the electric conductive members 81a and 81b of the rotary member 8. Due to the slip-ring electrical connection, electricity is supplied to the electric heating element 121 since current flows from the brushes 21 and 22 through the electric conductive members 81a and 81b and through electrodes 83a and to the electric leads 122. The current supplied to the heating element 121 provides heat resistively.

The upper end of the tubular rivet 17 is fixed to a ring 131 provided on the pan bottom plate 13 while the opposite lower end is caulked through a metal washer 19 disposed on the outer lower side of the lower dish 11, as shown in FIG. 2. The pan lid 14 is fixed to the pan bottom plate 13 in such a way that strips 143a provided at the peripheral edge of the pan lid 14 are bent to hold the peripheral edge of the pan bottom plate 13.

In operation, a switch (not shown) is actuated to operate the motor 14 which rotates the rotary member 8, the fan 9, and the rotary pan 10. Simultaneously, electricity is supplied to the electric heating element 12 through the slip ring arrangement of the brushes and conductive elements, thereby heating the pan bottom plate 13. Subsequently, sugar or the like is added through the inlet 15b. The sugar is melted by heat transferred to the pan bottom plate 13 and the melted sugar is discharged outside the rotary pan 10 by centrifugal force through the discharge outlets or clearances 30 formed between the pan lid 14 and the pan bottom plate 13. Upon discharge, the sugar is cooled to solidify by air flow generated from the fan 9 and the ribs 142 while being discharged outside through the clearance 20 formed between the cover 15 and the cylindrical tubular portion 2a. The solidified sugar, in cotton-like form, is accumulated within the reservoir 5 as cotton candy.

Although the pan lid 14 of the rotary pan 10 and the pan bottom plate 13 are formed separately from each other, these members may be formed integrally in such a way that the discharge outlets or openings 30 are formed at the peripheral wall of the one-piece member.

Figure 5:
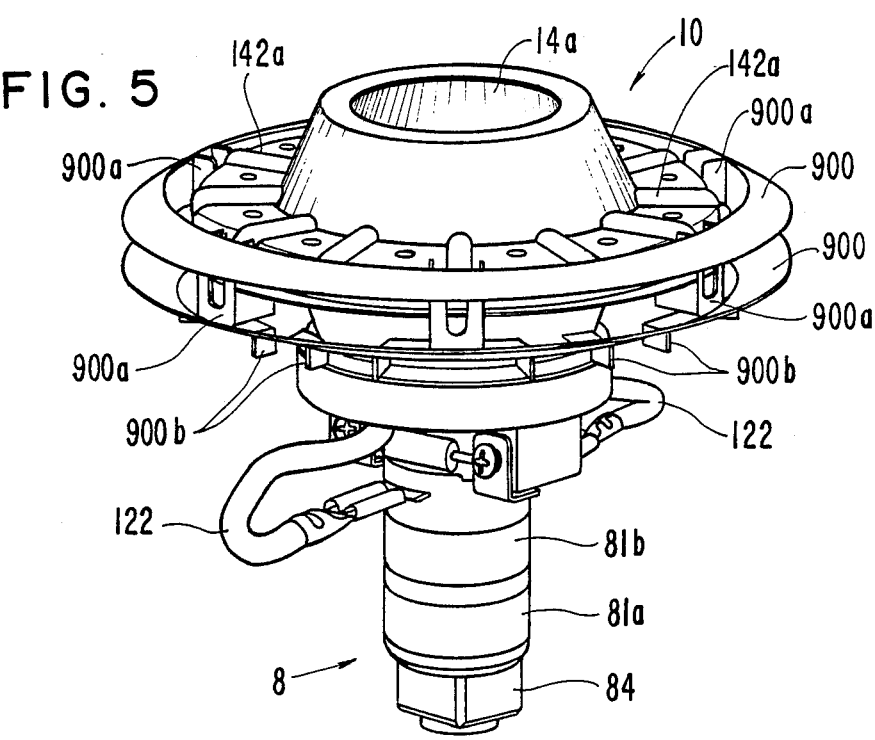
FIG. 5 is a perspective view of the embodiment of FIG. 1 in assembled form.

FIG. 5 is a perspective view of an assembled body 3 and rotary pan 10 in which an alternative embodiment is used. In this embodiment, an air current supplying mechanism is provided around the rotary pan 10 instead of providing the fan 9 under the rotary pan. Specifically, ring members 900 are mounted around the pan 10 by means of a plurality of blades 900a which also serve as spacers, and a plurality of blades 900b which protrude from under the lower ring member to generate air flow.

In either embodiment, the cotton candy machine uses a heating element that is disposed adjacent to a lower side of the pan bottom of the rotary pan and is rotatably integrally with the rotating pan. Accordingly, heat will not be dissipated by air flow between the heating element and the bottom of the rotary pan, as is the case with existing devices. As a result, heating efficiency is improved.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

We claim:

1. A cotton candy machine comprising,
   a rotary pan having upper and lower plates and a radial outlet defined between peripheral edges of the upper and lower plates,
   a plate-shaped heating element disposed beneath the lower plate of the rotary pan and being rotatable with the rotary pan and in surface contact with the lower plate,
   a motor having an output shaft connected to the rotary pan for imparting rotary motion to the rotary pan and to the heating element,
   a sliding electrical connection for connecting the heating element to a power source,
   a dish for supporting the heating element beneath the lower plate and being supported on the output shaft of the motor beneath the rotary pan, and
   a cooling fan disposed beneath the dish for cooling melted sugar which is discharged by centrifugal force from the radial outlet of the rotary pan.

2. A cotton candy machine as claimed in claim 1 wherein the sliding electrical connection comprises a rotating member having a central cylindrical tube which receives a fixed shaft extending upwardly from a base, the rotating member having two spaced apart electrically conductive portions electrically connected to two electrodes, wherein positive and negative leads of the heating element are connected to the two electrodes, and two brushes slidably contacting the two electrically conductive portions to provide positive and negative sliding connections.

3. The cotton candy machine as claimed in claim 2, wherein the fan is fixedly connected to an upper end of the rotary member and wherein the rotary pan is connected to the rotary member above the fan.

4. A cotton candy machine as claimed in claim 2, wherein the rotary pan is connected to an upper end of the rotary member and wherein in the fan comprises an upper disc and a lower disc interconnected and spaced apart by a plurality of equidistantly spaced blades disposed between the upper and lower discs, wherein the upper and lower discs are disposed circumferentially around the rotating pan and being rotatable therewith.

5. A cotton candy machine as claimed in claim 4, wherein the fan further comprises a plurality of spaced apart blades connected to a lower surface of the lower disc for generating air flow upon rotation of the rotary pan.

6. A cotton candy machine claimed in claim 1, wherein the heating element and the motor are powered by the same power source.

7. A cotton candy machine as recited in claim 2, wherein the rotating pan comprises a lower dish having an open upper end, wherein the heating element is disposed at the open upper end, a pan bottom plate placed over the heating element and a pan lid interconnected to the pan bottom plate, wherein clearances between the pan lid and the pan bottom plate provide peripheral discharge outlets for sugar melted by the heating element.

8. A cotton candy machine as claimed in claim 7, wherein the rotating pan further comprises, a spacer disposed between the heating element and the lower dish, and a rivet extending coaxially through the spacer to interconnect the lower dish and the bottom plate.

9. A cotton candy machine as claimed in claim 8, further comprising, a cover fixedly connected to the shaft above the rotating pan and having a plurality of air inlet holes formed on a periphery of the cover and on an upper closed end of the cover and further comprising a cylindrical tubular member connected to a base of the cotton candy machine and being vertically aligned with and spaced apart from the cover to form a clearance therebetween, wherein the clearance is aligned with the discharge outlets for melted sugar.

10. A cotton candy machine as claimed in claim 1, wherein the heating element comprises a heating plate having positive and negative leads connected thereto wherein the positive and negative leads are connected to the slidable electrical connection.

11. A cotton candy machine as claimed in claim 11, wherein the upper and lower plates are substantially in close proximity to each other and have portions in surface contact with each other.

* * * * *